Nov. 10, 1970 R. G. RUDOLPH 3,539,934
MONOSTABLE MULTIVIBRATOR CIRCUIT WITH A LINEAR
VOLTAGE CONTROLLED PULSE WIDTH
Filed Aug. 7, 1968
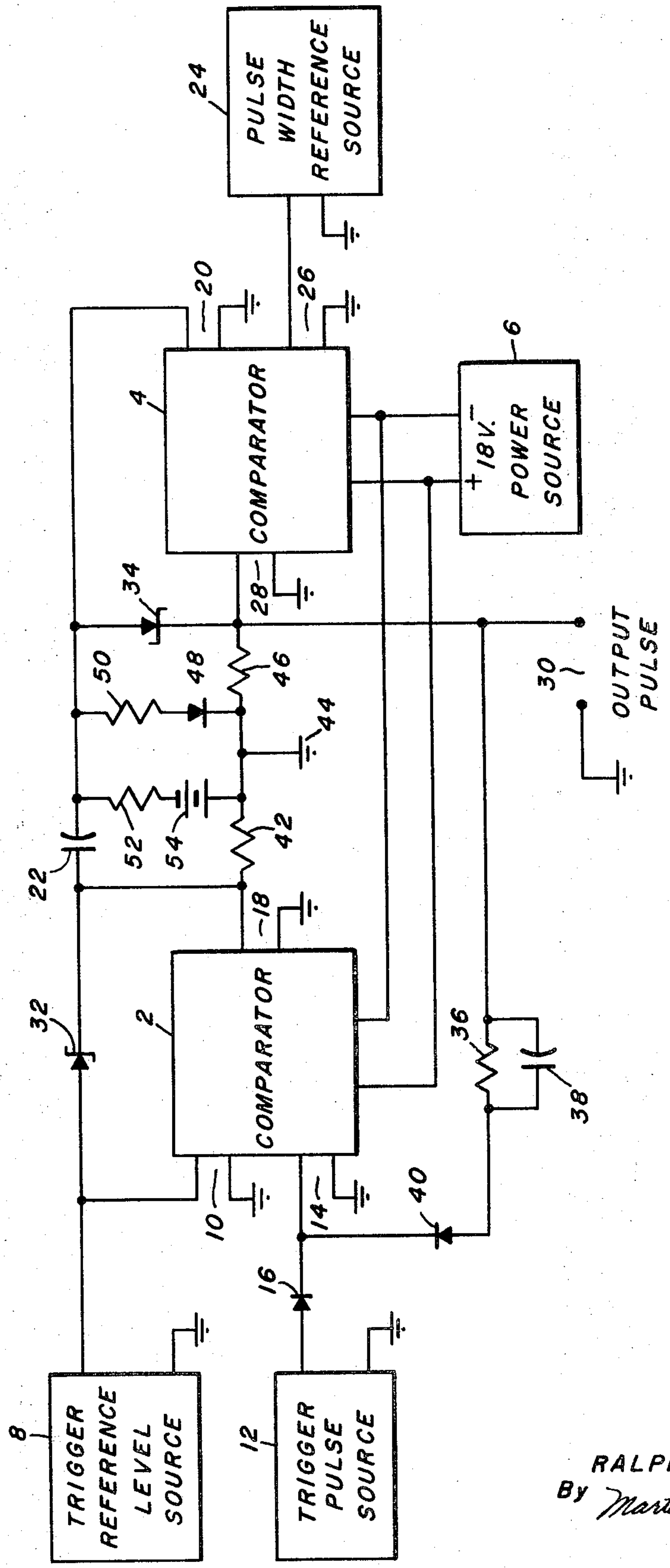
INVENTOR.
RALPH G. RUDOLPH
By Martin J. Carroll
Attorney

United States Patent Office 3,539,934

Patented Nov. 10, 1970

3,539,934

MONOSTABLE MULTIVIBRATOR CIRCUIT WITH A LINEAR VOLTAGE CONTROLLED PULSE WIDTH

Ralph G. Rudolph, Pittsburgh, Pa., assignor to United States Steel Corporation, a corporation of Delaware

Filed Aug. 7, 1968, Ser. No. 750,922
Int. Cl. H03k *3/10*
U.S. Cl. 328—207 10 Claims

ABSTRACT OF THE DISCLOSURE

A monostable multivibrator circuit uses a source of trigger voltage pulses to provide an output from a first comparator. The output is connected through a timing circuit to provide an essentially linear changing voltage to a first input of a second comparator and to change the output from the second comparator. When the changing voltage reaches a reference voltage level provided at a second input to the second comparator, the second comparator output changes to its original condition.

This invention relates to a monostable multivibrator circuit having an output pulse width which varies in a linear relation to a reference voltage.

In electronic circuits which measure or control delays or processes involving delays, such as flow measurement, monostable multivibrator circuits are used to produce a voltage pulse whose width is proportional to a controlling reference voltage. While such circuits are known, none that I am aware of are sufficiently simple and rugged for use in an industrial environment while at the same time meeting requirements of accuracy and a linear reponse to control settings.

It is, therefore, an object of my invention to provide a simple and rugged monostable multivibrator circuit.

Another object is to provide such a circuit with an output pulse width that accurately responds in a linear relation to a changing reference voltage.

These and other objects will be more apparent after referring to the following specification and attached drawing in which the single figure is a schematic wiring diagram of the monostable multivibrator circuit of my invention.

Referring more particularly to the drawing, the reference numerals 2 and 4 indicate comparators which are temperature compensated, have a high input impedance, a low output impedance, an output of 15 volts maximum and are accurate within 0.1%. Each of the comparators is preferably half of a Model 19–501, manufactured by the Consolidated Electrodynamics Corporation, Devar Kinetics Division, 706 Bostwick Ave., Bridgeport, Conn. Comparators 2 and 4 are connected to a ±18 volt D.C. power source 6. A trigger reference level source 8 provides an input 10 to comparator 2. A source of trigger pulses 12 provides a second input 14 to comparator 2 through a diode 16. Comparator 2 has an output 18 connected to input 20 of comparator 4 through a capacitor 22. A pulse width reference source 24 provides an input 26 to comparator 4. An output 28 of comparator 4 is connected to an output pulse terminal 30.

A Zener diode 32 is connected between input 10 and output 18 of comparator 2 and a Zener diode 34 is connected between input 20 and output 28 of comparator 4.

A resistance 36 in parallel with a capacitor 38 are connected in series with a diode 40 between input 14 of comparator 2 and output 28 of comparator 4. A resistance 42 is connected between output 18 of comparator 2 and a common ground 44. A resistance 46 is connected between output 28 of comparator 4 and ground 44. A diode 48 and a resistance 50 are connected in series between input 20 of comparator 4 and ground 44. A resistance 52 and a D.C. voltage source 54 are connected in series between input 20 of comparator 4 and ground 44.

In operation, assume that the multivibrator circuit is in a condition ready to receive a pulse from the trigger pulse source 12, which may be any source of voltage pulses, as for example from circuitry producing pulses identified by flow density changes. At this time, comparator 2 has an output of +10 volts at output 18, comparator 4 has an output of zero volts at output 28 and capacitor 22 has been charged to +10 volts through diode 48 and resistor 50. Outputs 18 and 28 are limited to +10 volts by Zener diodes 32 and 34. If a trigger pulse 12, with a voltage greater than the trigger reference level voltage 8 is applied to input 14 of comparator 2, output 18 will change from +10 volts to zero volts. Capacitor 22 will then discharge through resistor 52 and voltage source 54 and the output impedance of comparator 2, exponentially decaying to zero volts. The discharge current causes a negative voltage at input 20 of comparator 4, which, in turn, causes comparator output 28 to go to +10 volts, assuming the negative voltage exceeds the voltage of the pulse width reference source 24. This begins the output pulse at terminals 30.

The negative voltage applied to input 20 will have an absolute value greater than the reference voltage 24 for a length of time determined by the discharge rate of capacitor 22 and the difference between the negative voltage applied at input 20 and the reference voltage 24. When the negative voltage applied at input 20 equals the reference voltage 24, output 28 changes to zero volts completing the output pulse.

The +10 volts of output 28 of comparator 4 is fed back to input 14 of comparator 2 through resistance 36, capacitor 38 and diode 40. This latching circuit maintains the output 18 of comparator 2 at zero volts even though the trigger pulse 12 may have dropped below the trigger reference level 8. When the output pulse is completed, input 14 to comparator 2 goes to zero volts changing output 18 to +10 volts which then begins to charge capacitor 22, preparing for the next trigger pulse.

If resistance 52 is selected to be at least 100 times larger than the output impedance of output 18 of comparator 2, and if the output pulse width 30 is less than 10% of the time constant of resistance 52 and capacitor 22, the relation between the output pulse width 30 and the pulse width reference voltage 24 is essentially linear. The linear range is expanded by voltage source 54, but voltage source 54 is not necessary. If resistance 52 is also much smaller than the parallel combination of the input impedance of input 20 of comparator 4 and the leakage resistance of diode 48, and if the output pulse width is less than 5% of the time constant of resistance 52 and capacitor 22, the linear accuracy is about 0.1%.

Diode 16 assures that only a positive going trigger pulse is received at input 14 of comparator 2 and may not be needed depending on the nature of the trigger pulse. A capacitive coupling between source 12 and input 14 will eliminate the need for diode 16. Diode 40 assures that the trigger voltage does not feed into the pulse output 30 and is not required if resistance 36 is sufficiently large.

Rise time and fall time of output pulse 30 is improved by capacitor 38, but capacitor 38 is not necessary.

Resistance 46 is a load resistance to stabilize the operation of comparator 4. Resistance 50 should be the smallest safe resistance that comparator 2 is capable of driving so that capacitor 22 can be charged as rapidly as possible. However, if the off time between trigger pulses is more than twice the pulse length, then diode 48 and resistance 50 may be omitted and capacitor 22 will charge through resistance 52 but at a lower rate.

While one embodiment of my invention has been shown and described, it will be apparent that other adaptions and modifications may be made without departing from the scope of the following claims.

I claim:

1. A monostable multivibrator circuit comprising a first comparator having a first voltage input, a second voltage input and a voltage output; a second comparator having a first voltage input, a second voltage input and a voltage output; a power source connected to said comparators; a trigger reference level voltage source connected to the first input of the first comparator; a source of trigger voltage pulses connected to the second input of the first comparator to change the output voltage of the first comparator when the magnitude of the trigger voltage pulse changes with respect to the trigger reference level voltage; a pulse width reference voltage connected to the first input of the second comparator; and means connected to the output of the first comparator and the second comparator, and circuit means responsive to change in the output of the first comparator for providing a changing voltage to the second input of the second comparator thereby changing the output of the second comparator from a first state to a second state and changing the output of the second comparator to the first state when the magnitude of said changing voltage reaches the level of the pulse width reference voltage.

2. A monostable multivibrator circuit according to claim 1 which includes a latching circuit connected between the output of the second comparator and the second input of the first comparator to maintain the magnitude of the second input to the first comparator from the time the output of the first comparator changes in response to a trigger pulse until the output of the second comparator changes to said second state.

3. A monostable multivibrator circuit according to claim 1 which includes means connected to the respective outputs and first inputs of said comparators to limit the magnitude and polarity of said voltage outputs.

4. A monostable multivibrator circuit according to claim 1 in which said means for providing a changing voltage includes a capacitor connected between the output of the first comparator and the second input of the second comparator, and circuit means responsive to changes in the output of the first comparator and connected to the capacitor and the output of the first comparator for charging and discharging the capacitor.

5. A monostable multivibrator circuit according to claim 4 in which said circuit means includes a first resistance, a diode, and a second resistance, connected in series with said diode, said first resistance being connected in parallel with said diode and second resistance.

6. A monostable multivibrator circuit according to claim 5 which includes a voltage source connected in series with said first resistance.

7. A monostable multivibrator circuit according to claim 4 which includes a latching circuit connected between the output of the second comparator and the second input of the first comparator to maintain the magnitude of the second input to the first comparator from the time the output of the first comparator changes in response to a trigger pulse until the output of the second comparator changes to said second state.

8. A monostable multivibrator circuit according to claim 4 which includes means connected to the respective outputs of said comparators to limit the magnitude and polarity of said voltage outputs, and a latching circuit connected between the output of the second comparator and the second input of the first comparator to maintain the magnitude of the second input to the first comparator from the time the output of the first comparator changes in response to a trigger pulse until the output of the second comparator changes to said second state.

9. A monostable multivibrator circuit according to claim 5, which includes means connected to the respective outputs of said comparators to limit the magnitude and polarity of said voltage outputs, and a latching circuit connected between the output of the second comparator and the second input of the first comparator to maintain the magnitude of the second input to the first comparator from the time the output of the first comparator changes in response to a trigger pulse until the output of the second comparator changes to said second state.

10. A monostable multivibrator circuit according to claim 6 which includes means connected to the respective outputs of said comparators to limit the magnitude and polarity of said voltage outputs, and a latching circuit connected between the output of the second comparator and the second input of the first comparator to maintain the magnitude of the second input to the first comparator from the time the output of the first comparator changes in response to a trigger pulse until the output of the second comparator changes to said second state.

References Cited

UNITED STATES PATENTS

| | | | |
|---|---|---|---|
| 3,105,939 | 10/1963 | Onno et al. | 328—146 X |
| 3,292,098 | 12/1966 | Bensing | 330—30 X |
| 3,456,130 | 7/1969 | Bailey | 307—273 |

STANLEY D. MILLER, Primary Examiner

U.S. Cl. X.R.

307—235, 265, 273; 328—146